US008522268B2

(12) United States Patent
Chen et al.

(10) Patent No.: US 8,522,268 B2
(45) Date of Patent: Aug. 27, 2013

(54) METHOD AND APPARATUS FOR CREATING A TARGETED INTEGRATED IMAGE

(75) Inventors: Michael Chen, Wallingsford, PA (US); Mike Tudisco, Hatboro, PA (US); Jack Birnbaum, Southampton, PA (US)

(73) Assignee: Concurrent Computer Corporation, Duluth, GA (US)

( * ) Notice: Subject to any disclaimer, the term of this patent is extended or adjusted under 35 U.S.C. 154(b) by 1662 days.

(21) Appl. No.: 10/826,671

(22) Filed: Apr. 16, 2004

(65) Prior Publication Data

US 2005/0081237 A1   Apr. 14, 2005

Related U.S. Application Data

(63) Continuation-in-part of application No. 10/685,354, filed on Oct. 10, 2003.

(51) Int. Cl.
*H04N 7/10* (2006.01)
*H04N 7/025* (2006.01)
*G06Q 30/00* (2012.01)

(52) U.S. Cl.
USPC .............. 725/32; 725/34; 725/35; 705/14.49; 705/14.53

(58) Field of Classification Search
None
See application file for complete search history.

(56) References Cited

U.S. PATENT DOCUMENTS

| | | | |
|---|---|---|---|
| 5,815,145 A | 9/1998 | Matthews, III | 345/327 |
| 5,907,323 A | 5/1999 | Lawler et al. | 345/327 |
| 6,177,931 B1 | 1/2001 | Alexander et al. | 345/327 |
| 6,201,536 B1 | 3/2001 | Hendricks et al. | |
| 6,389,075 B2 | 5/2002 | Wang et al. | |
| 6,415,437 B1 | 7/2002 | Ludvig et al. | |
| 6,481,012 B1 | 11/2002 | Gordon et al. | |
| 6,760,916 B2 * | 7/2004 | Holtz et al. | 725/34 |
| 2002/0059602 A1 * | 5/2002 | Macrae et al. | 725/42 |
| 2002/0184047 A1 * | 12/2002 | Plotnick et al. | 705/1 |
| 2003/0018969 A1 * | 1/2003 | Humpleman et al. | 725/34 |
| 2003/0105831 A1 * | 6/2003 | O'Kane | 709/217 |
| 2003/0110499 A1 * | 6/2003 | Knudson et al. | 725/42 |
| 2003/0229898 A1 * | 12/2003 | Babu et al. | 725/87 |
| 2004/0030599 A1 * | 2/2004 | Sie et al. | 705/14 |
| 2004/0163101 A1 * | 8/2004 | Swix et al. | 725/9 |
| 2006/0156336 A1 | 7/2006 | Knudson et al. | 725/39 |

FOREIGN PATENT DOCUMENTS

WO   WO-00/64169 A1   10/2000

OTHER PUBLICATIONS

EPO, "Search Report", EPSN EP 05 73 5575; Mailed Jun. 14, 2010; PCT/US2005/012561.

* cited by examiner

*Primary Examiner* — Jason J Chung
*Assistant Examiner* — Omar S Parra
(74) *Attorney, Agent, or Firm* — Philip H. Burrus, IV (57) ABSTRACT

A targeted integrated image is created for delivery to a user. Content of potential interest to the user is determined based on at least one user preference. This determination may be made prior to or during the user's request for an image, such as video content, or while the user is receiving an image, such as a menu or programming guide. An image representing the content of potential interest to the user, such as a barker is selected and combined with another image of interest to the user to form a targeted integrated image for delivery to the user. The user preference may include information representing content viewing habits or content ordering habits of the user. The user preferences may be associated with the identity of the user.

33 Claims, 8 Drawing Sheets

METHOD AND APPARATUS FOR CREATING A TARGETED INTEGRATED IMAGE

CROSS-REFERENCE TO RELATED APPLICATION

This application is a Continuation-in-part of U.S. patent application Ser. No. 10/685,354 filed Oct. 10, 2003 and hereby incorporated by reference.

BACKGROUND

The present invention is directed to a method and apparatus for creating targeted images. More particularly, the present invention is directed to a method and apparatus for creating a targeted integrated image.

Short video clips, or barkers, advertising specific video content or other products, hereinafter "barkers," are common in the entertainment industry. For example, before a feature presentation, "movie watchers" see a myriad of movie previews, or barkers, that highlight particularly enjoyable parts of the advertised movie. The barkers used in this manner are intended to entice the viewers to choose to view advertised content.

Like the film industry, the broadcast television industry has also used barkers for advertising. In this environment, programmers send the barker to all viewers "tuned in" to a particular station. Hopefully, the barker will entice television viewers to view the advertised video.

Because of the effectiveness of barkers in both the film industry and broadcast television industry, they have become particularly appealing in the digital television industry.

Digital television networks enable two-way communication so that a subscriber can interact or "request" information from the network equipment. Typically, a menu—also called an interactive program guide (IPG) or electronic program guide (EPG)—is employed to list the content available for viewing. The IPG application enables a viewer to browse listings of available programming and associated information and to select content for viewing. The subscriber can utilize the menu to request additional information regarding the offerings.

Typically, the menu has a numeric listing by channel of broadcast television programming. Additionally, a subscriber may have access to narrowcast applications. Narrowcast programming is point-to-point streaming of video from a storage point in the network to a specific subscriber. Narrowcast applications are made possible by compression techniques, e.g., the standards developed by the Moving Picture Experts Group (MPEG), that enable more content to be delivered to viewers with little or no degradation in picture quality. The resulting increase in transmission capacity allows narrowcast programming to be placed alongside broadcast programming for delivery to viewers.

A dominant narrowcast application is the delivery of content on demand (COD). This content may span many categories, including movies on demand (MOD), video on demand (VOD), subscription video on demand (SVOD), free on demand (FOD) and network-based digital video recording (NDVR).

The user experience provided by an IPG is critical to the success of narrowcast services, since the IPG controls access to the library of narrowcast content available to viewers. Typically, the IPG presents the subscriber with COD menus that usually begin with a general description of the offerings, from which the subscriber can drill down to specific content to be viewed. The ability to deliver narrowcast content to viewers creates the opportunity to provide a targeted viewing experience, which allows advertisement and promotional content to be selected for and delivered to each viewer. This ability can greatly improve the user experience of both menuing and program watching and can also greatly improve the success of narrowcast services, such as COD.

In this menuing environment, it is desirable to play barkers to entice the subscriber to watch a particular movie. If COD is available, the subscriber can order the content and watch it on his/her television. Otherwise, the subscriber would need to rent, purchase, or view the movie from another source.

Historically, barkers played in the menu environment have been broadcast. The user's premises device is typically directed to tune to a particular channel, and the barkers are broadcast such that all subscribers see the same barker. A menu screen is drawn around the barker through the use of the premises device presentation software, based upon information regarding content available for viewing. The information regarding content available for viewing is typically provided by the on-demand computers serving the network. Since the barkers are broadcast, all customers receiving on-demand content are presented with the same barkers. The users may then be bombarded with barkers that are not interesting and that may, in fact, be offensive. This makes the barkers ineffective in enticing customers to order the advertised content.

For example, for a customer interested in children's programming, the barker displaying PG-13 or R rated content would be unattractive and, perhaps, offensive. Likewise, for an adult seeing R rated programming, a barker displaying a children's program would be similarly uninteresting.

There is thus a need for a technique and device for creating targeted integrated images, including targeted barkers, to entice a user to view particular content. There is also a need to link the user to the barker so that the barker will be more effective in enticing the user to order content advertised via the barkers.

SUMMARY

According to an exemplary embodiment, a method and apparatus are provided for creating a targeted integrated image for delivery to a user.

According to one embodiment, content of potential interest to the user is determined based on at least one user preference. This determination may be made prior to or during the user's request for an image, such as video content, or while the user is receiving an image, such as a menu or programming guide. An image representing the content of potential interest to the user, such as a barker, is selected and combined with another image of interest to the user to form a targeted integrated image for delivery to the user.

According to exemplary embodiments, the user preference may include information representing content viewing habits or content ordering habits of the user. The user preferences may be associated with the identity of the user.

The objects, advantages and features of the present invention will become more apparent when reference is made to the following description taken in conjunction with the accompanying drawings.

DETAILED DESCRIPTION

According to exemplary embodiments, in a viewing environment in which each customer's device receives an independent video stream, the customer's identity or device identification code is known. That code may be used to ascertain the customer's viewing habits, e.g., from the database that maintains the customer purchasing information. Once the system is able to ascertain the customer's viewing habits, the system may predict the content that the customer would be likely to enjoy. The system can then seek such content and, if available, send a barker for that content to be viewed by the customer.

The customer's viewing habits may be determined based on numerous variables, such as, but not limited to, time of viewing, genre's viewed, personal identification number ("PIN"), identity code, menu selections, characteristics of content viewed (titles, actors, etc).

Figure 1:
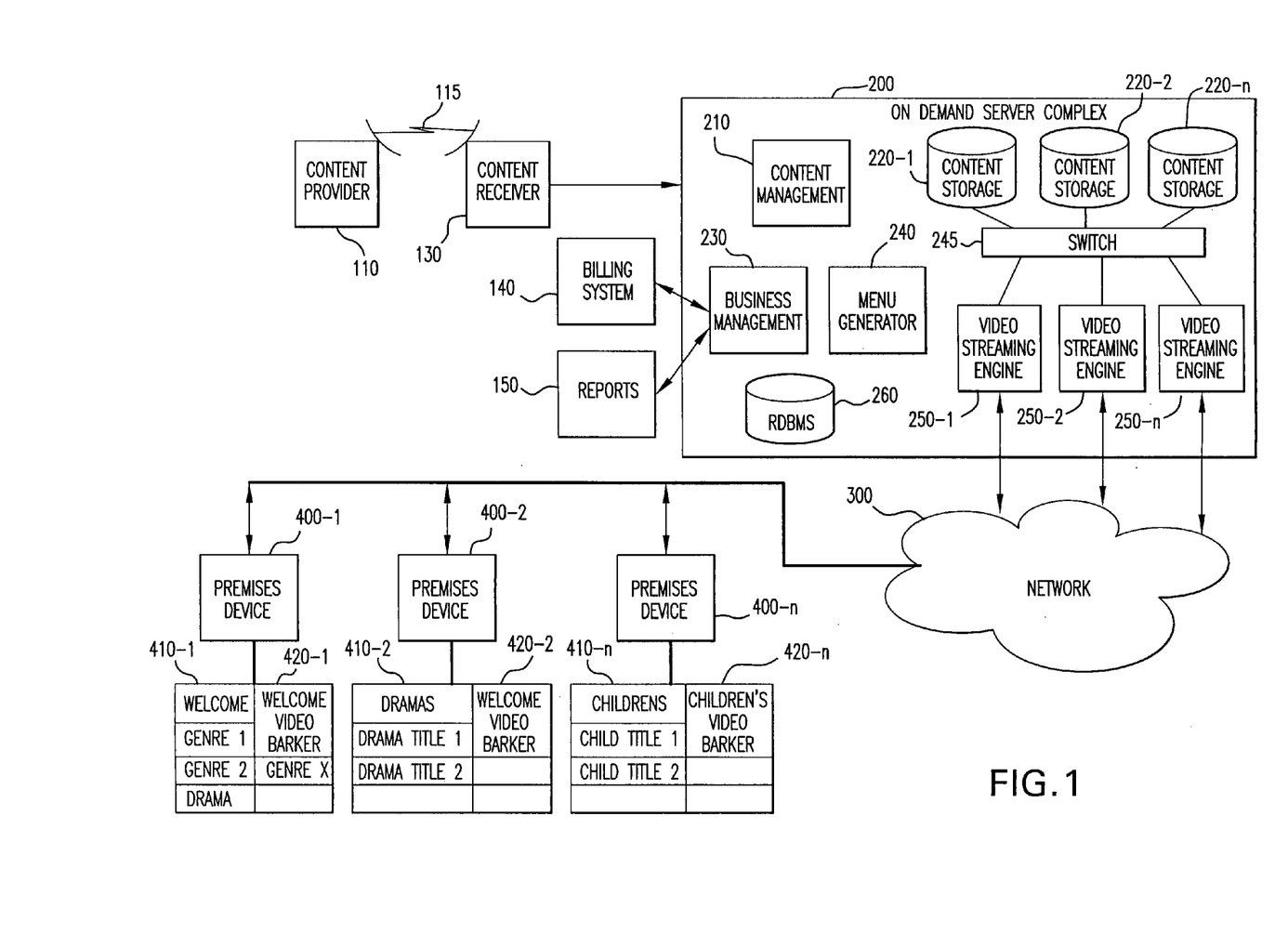
FIG. 1 illustrates an exemplary system in which the invention may be implemented.

FIG. 1 illustrates an exemplary video-on-demand (VOD) server complex system in which the invention may be implemented. In the system shown in FIG. 1, one or more content provider(s) 110 provide content to a VOD server complex 200 in various formats via various communication means 115. For example, the server complex 200 may receive RF signals by satellite, ATM data from ATM networks, local feeds and other information via terrestrial link. The content provider 110 may also provide the content by tape, DVD, or any other desired and suitable media.

The content is received by a content receiver 130 and forwarded to the server complex 200 for storage in the content storage 220. Although depicted as being distinct from the server complex 200, the content receiver 130 may be included in the server complex. In the server complex 200, the content is processed and reformatted as necessary. For example, content may be received in digitally compressed format, demultiplexed by a demultiplexer (not illustrated) and stored in any convenient format or formats, such as MPEG-1 or MPEG-2. It will be appreciated, however, that the present invention is not limited to these formats. Details of the processing and reformatting have been omitted from FIG. 1 for ease of illustration.

The reformatted content is stored on the content storage devices 220-1 . . . 220-n. Each of the content storage devices may include, e.g., a disk array, such as a JBOD Oust a bunch of disks) or RAID (redundant array of inexpensive disks). The content may be stored in an encrypted format and then may be streamed in an encrypted format via a network 300 to premises devices 400-1, . . . , 400-n. Alternatively, the content may be encrypted as each session is streamed.

The data received by the server complex 200 may include, in addition to the content itself, barkers and content descriptive data regarding the content received. This content descriptive data may include, for example, information indicative of the content type, title, source, participants, summary, rating, time length, etc., herein referred to as "metadata".

In addition, the data received by the server complex 200 may include trick files. Trick files are precompiled files used in narrowcast systems to implement trick mode playback, such as fast-forward and rewind, in an efficient fashion. Rewinding or fast forwarding by playing the normal playback file at a higher rate of speed, in the manner done by cassette players and VCRs, is not an ideal or efficient choice when servicing multiple users, since it places significantly higher demands on the components in the system. In a VOD system that services multiple users, trick files are used to achieve fast forwarding and rewinding. The trick files are composed of a subset, for example every other complete frames, of the normal file. When the trick file is played at normal speed, it appears that the normal playback file is being played back at a faster speed.

The server complex 200 may include a CPU or other processing device (not shown) and a relational database management system (RDBMS) 260. The RDBMS 260 functions as a server or storage device and has appropriate software and storage devices. The storage devices of the RDBMS 260 contain a listing or table of one or more of the following: the content providers, the subscribers, the servers upon which the content is located, the orders, the purchase history of each subscriber, the content files, metadata related to the content files, and data regarding the usage (demand) of the content. The RDBMS is managed by a business manager 230 which additionally may interface with a billing system 140 to provide billing information to the billing system for the system operator. The business manager 230 may also provide reports regarding the operation of the server complex and/or coordinate with a reports server 150 for generating reports. In addition, the business manager 230 may maintain an authorization system (not shown) which contains information on the features, privileges, benefits, bonuses, space, tiers, etc., available to each customer and/or to each content provider. The authorization system may be external or may be included within another server, such as part of the RDBMS 260. Thus, when a customer requests content, the system queries the business manager 230 to determine whether or not the customer is authorized to receive the content. If so, then the request may be approved. If not, then the request may be denied. Likewise, if a content provider 110 wishes to store a movie, that request may be granted, denied, or granted only with certain restrictions, such as to size or location. The RDBMS 260 further captures every viewing event by each premises device identification, customer code, personal identification number (PIN) or similar identification data.

According to an exemplary embodiment, the customer requests a program via a premises device 400-1 . . . 400-n, such as, but not limited to, a set-top-box, personal computer, lap-top, personal digital assistant, cellular phone or the like. The request is sent over the interactive network 300. The interactive network 300 may be any type of network capable of transferring data electronically, such as, but not limited to, cable networks, the Internet, wireless networks, Telco networks, or satellite networks. For ease of explanation, this description shall use the terminology for a cable network, but the present invention can be implemented on other types of networks even though the terminology might be different.

A request for content or a menu sent by a user from a premises device 400-1, . . . 400-n is received by the server complex 200 and processed by the business manager 230. If authorized, the business manger 230 prompts the video stream engine 250-1, . . . , 250-n to send the requested content to the premises device 400-1, . . . , 400-n. The content is sent via network equipment that provides the managing, processing, and modulation, as appropriate, for the delivery of the video content across the network to the premises device 400-1, . . . , 400-n.

According to an exemplary embodiment, menus 410-1, . . . , 410-n may be narrowcast to the customer. Narrowcast or streaming of the menu to the customer, as well as combination of the narrowcast menu with a barker, may be performed, e.g., as described in the above-referenced U.S. patent application Ser. No. 10/685,354. Using the combination technique described in that copending application, or any other suitable combination technique, any specific content may be narrowcast to the user as he/she is viewing the menu.

When the menu viewing begins, the server complex 200 can determine the identity of the premises device and/or a user requesting the menu, as this information is contained in the up stream request for the menu. Based on the identity information, the business manager 230 can query the RDBMS to determine the past viewing of the premises device and/or the user. Based on the past viewing, the RDBMS can determine the best barker to send to the user for playing in a barker window 420-1, . . . , 420-n within a menu screen 410-1, . . . , 410-n. It should be appreciated that the barker could also be audio content played while the user is viewing content.

As described above, according to exemplary embodiments, a targeted integrated image may be combined with an image for delivery to a user. For example, a barker may be combined with a movie as the movie is being viewed by a user. The barker may be played at any time or pursuant to rules such as only during the introduction or credits. The integrated image appears as a picture-in-picture display of the barker playing as the movie plays.

As another example, a barker may be combined with a trick file so that the barker is displayed next to the trick file being displayed. Alternatively, a barker may be combined with content being viewed, as the content is paused. When a user pauses normal content being viewed in a VOD system, the premises device does not actually pause, as a cassette player or a VCR does. Instead, the stream continues to be sent to the user's device. To achieve the appearance of a "pause", the stream may be composed of the last I frame. Alternatively, forward motion references may be used to indicate that the same picture data used last time should appear in the proper position, and any data not coded with the forward motion references appears as normal. Since the stream is being sent to the user, other information can easily be inserted into the stream. For example, a scaled barker which only changes the appearance of the upper right-hand corner of the display and otherwise codes for the same data as was coded the previous time in other areas of the picture, will appear to be combined with the last frame of the normal file, even if this is not what is really happening.

Furthermore, some user devices, such as the Motorola DCT set-top boxes, employ resolution techniques that further enable insertion of barkers or advertisements. Standard-definition COD content is typically encoded at half horizontal resolution. The set-top behavior upon resolution change is to leave the old frame data intact, left-justified on each horizontal line. This may be taken advantage of by encoding a scaled preview with a higher horizontal resolution. So, when played back, the scaled preview makes the last frame appear to shrink itself into the left half of the screen, and the scaled preview appears in the upper right-hand corner. This is similar in appearance to picture-outside-picture, but the picture on the left of the screen is frozen.

In this "pause" insertion example, the premises device does not actually have to stop playing content. Instead, alternate content can be used to implement the desired "pause" user experience.

While the terms "user", "subscriber", and "customer" are used interchangeably in this description, it should be appreciated that targeted images may be created for delivery to users, whether or not those users are the actual subscribers or customers. There may be multiple users for a given subscription. Thus, for example, each user of a premises device may have his or her own PIN, and individual user preferences may be maintained for each PIN.

For example, a child having a particular PIN may have a history of viewing children's programming. Is such a case, when the child's PIN is received, the viewing history related to the PIN is obtained, and an appropriate barker advertising children's content may be sent for display. Further, the PIN could be restricted to limited content.

For example, in the case of the child, the PIN could limit content viewed to children's programming. Likewise, preferences could be set with the PIN.

Rather than obtaining a viewing history indicative of actual content viewed, the RDBMS may categorize viewing via times during which content is viewed. Thus, the RDBMS may determine that users viewing content before, e.g., 8 PM, are typically children. Thus, during this time period, barkers advertising children's content may be played.

According to an exemplary embodiment, a narrowcast barker is selected, based, e.g., on the identity information received from the premises device, and combined with a menu for delivery to a user. The VOD system collects 200 data about each user's history. For example, the VOD system collects information regarding genre of content and titles of content received by each user. According to one embodiment, this information may be obtained whether the content received by the user is actually viewed or not. This information may be used to determine the interests of that subscriber.

The VOD system maintains a list of barkers available in, e.g., a database, such as the RDBMS 260. The barkers may be sorted by genre and title.

When a user initiates a session, the user's preference data is obtained from a data store, e.g., the RDBMS 260, based on the user's identifying information. The preference data is used to determine the barker set to be streamed.

For example, at the highest levels, a user's highest interest genre of content is determined based on the user's identifying information. Thus, if the PIN received corresponds to a user that most often receives and/or views horror movies, the horror movie genre may be selected. Once the genre is selected, the list of titles already received/ordered by the user may be compared to a list of titles available (with barkers).

Upon finding a title in that genre that has not been viewed and that has a barker, the barker related to that title may be selected and streamed to the user. This information may be maintained such that the next time the user initiates a session, a different targeted barker will be streamed. This process may continue for each menu navigated until the user selects content to view. At that point, the selected content may be played, and the selection information may be stored in the preference information.

Figure 2:
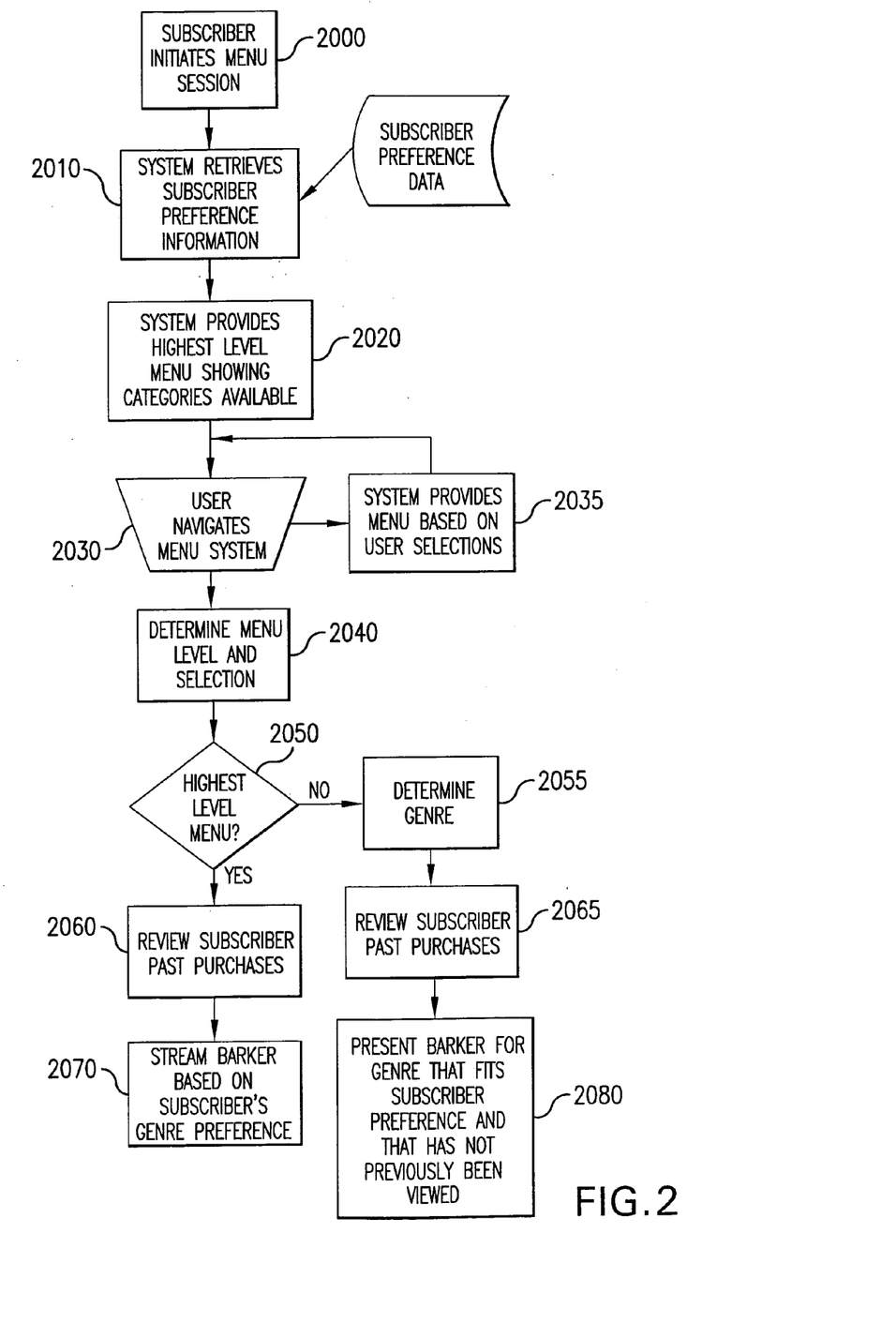
FIG. 2 illustrates an exemplary method for creating a targeted integrated image according to exemplary embodiments.

An exemplary process for creating a targeted integrated image in a menuing environment is illustrated in FIG. 2. The steps shown in FIG. 2 are directed towards integrating barkers into a menu for display to a user to illustrate how a targeted integrated image is created and delivered. It should be appreciated that the invention is not limited to integrating barkers in a menu environment but is applicable to integrating any targeted image into another image for delivery to a user. For example, the targeted image may include a barker, an advertisement, or any other image targeted based, e.g., on user preferences. The image into which the targeted image is integrated may include, e.g., a menu, a programming guide, content, a trick file, or any other image.

Referring to FIG. 2, a user (subscriber) begins a menu session at step 2000. At step 2010, information regarding subscriber preferences is obtained. This information may be obtained by accessing a data file associated with the user's identity. At this level, the information obtained may be related to the highest level of the menu. For example, the subscriber preferences may include favorite genres, a list of previously viewed selected for each genre, favorite actors, etc. At step 2020, a menu is provided to the user showing categories of content that are available for ordering. At step 2030, the user navigates through the menu. From step 2030, the user is provided with different menu levels at step 2035. As the user continues to navigate through the menu, step 2030 repeats.

As the user makes selections from the menu, the system determines the menu level and selections made by the user at step 2040. A determination is made at step 2050 whether the highest-level menu is being navigated, e.g., the genre level. If so, the subscriber's history, e.g., past purchases, are reviewed at step 2060, and barkers related to those purchases are removed from the barker list. Then, a barker is screened to the subscriber based, e.g., on the subscriber's genre preference, at step 2070.

If, at step 2050, it is determined that the highest-level menu is not being navigated, the genre of interest to the subscriber is determined at step 2055. At step 2065, the subscriber's past purchases are reviewed, and barkers related to the past purchases are removed from the barker list. From step 2065, the system presents a barker for the genre that fits the user's preferences and that has not been previously viewed at step 2080.

Once barkers are narrowcast to the user, they may be marked as viewed and placed at the end of a circular queue.

After the barker is presented to the user at steps 2070 or 2080, the user may either select content to view or continue to navigate menu system, in which case the process returns to step 2030.

Figure 3A:
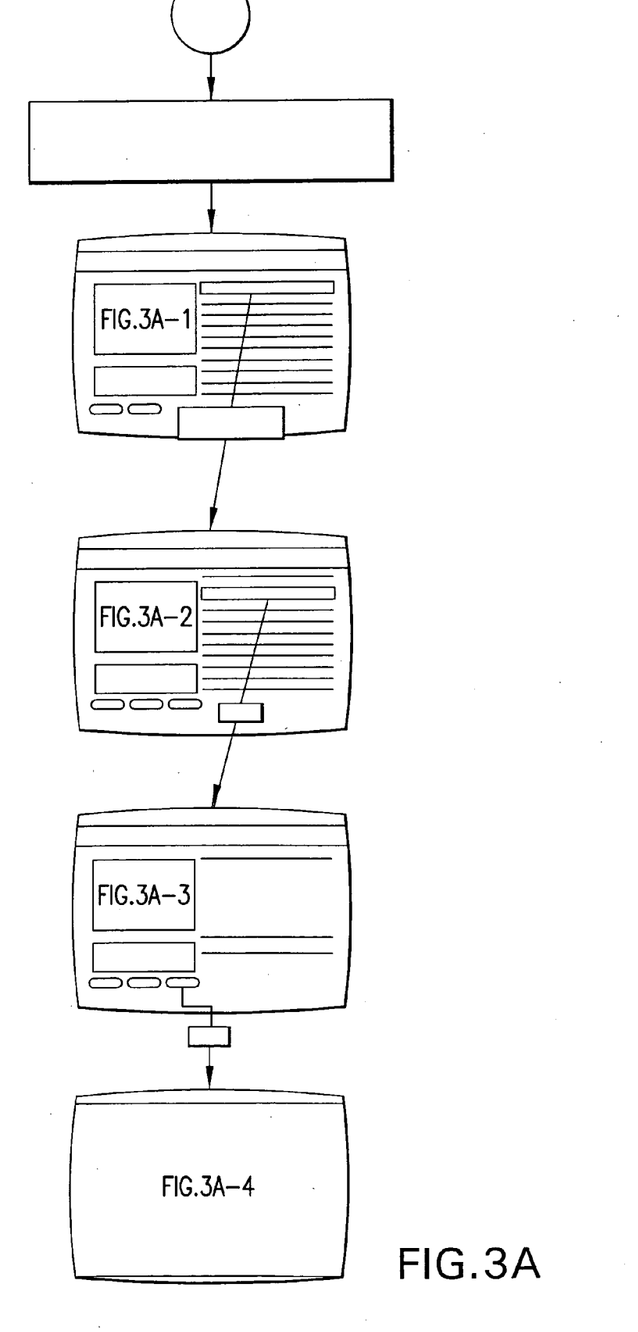
FIGS. 3A and 3B show an illustrative example of how user preference data is collected and used to generated a targeted integrated image according to an exemplary embodiment.
Figure 3A:
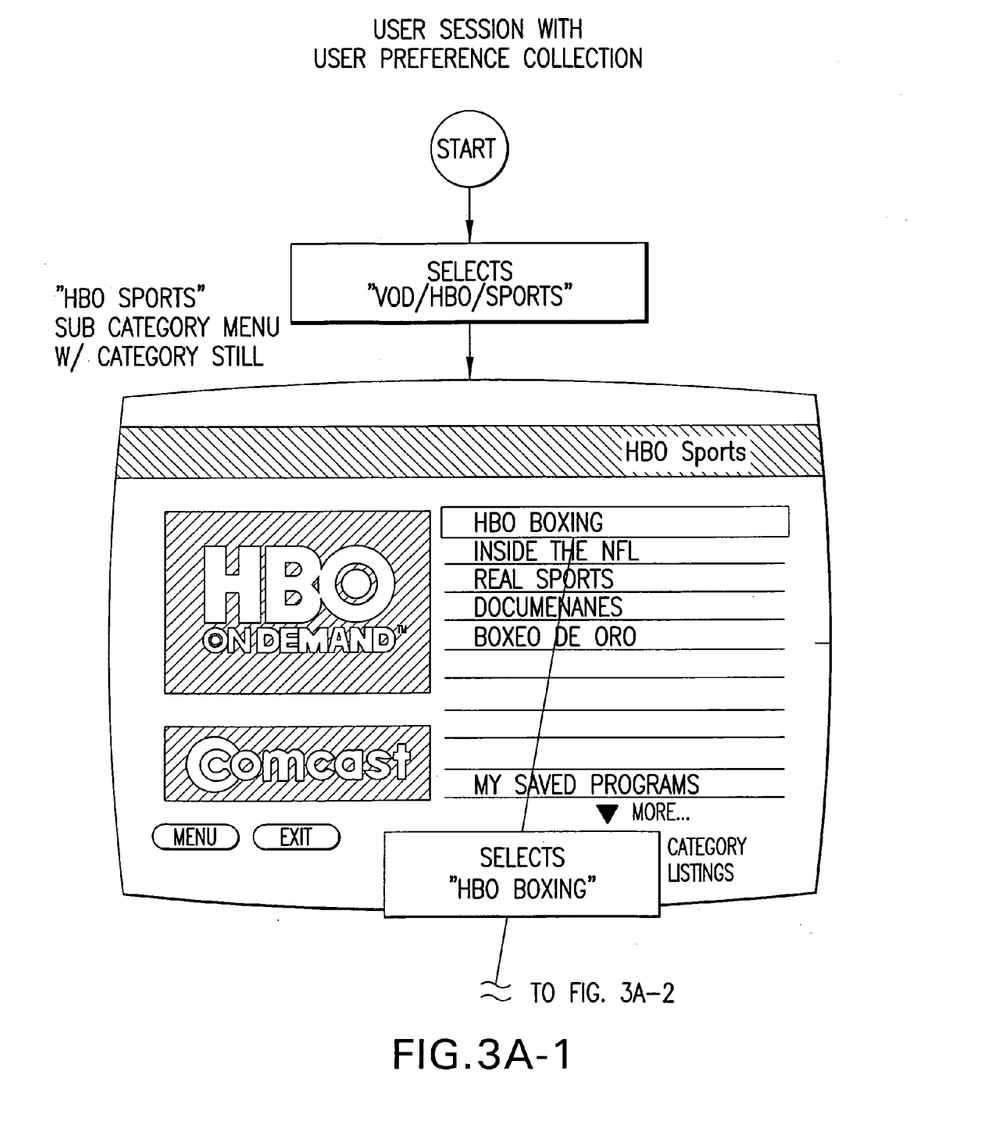
Figure 3A:
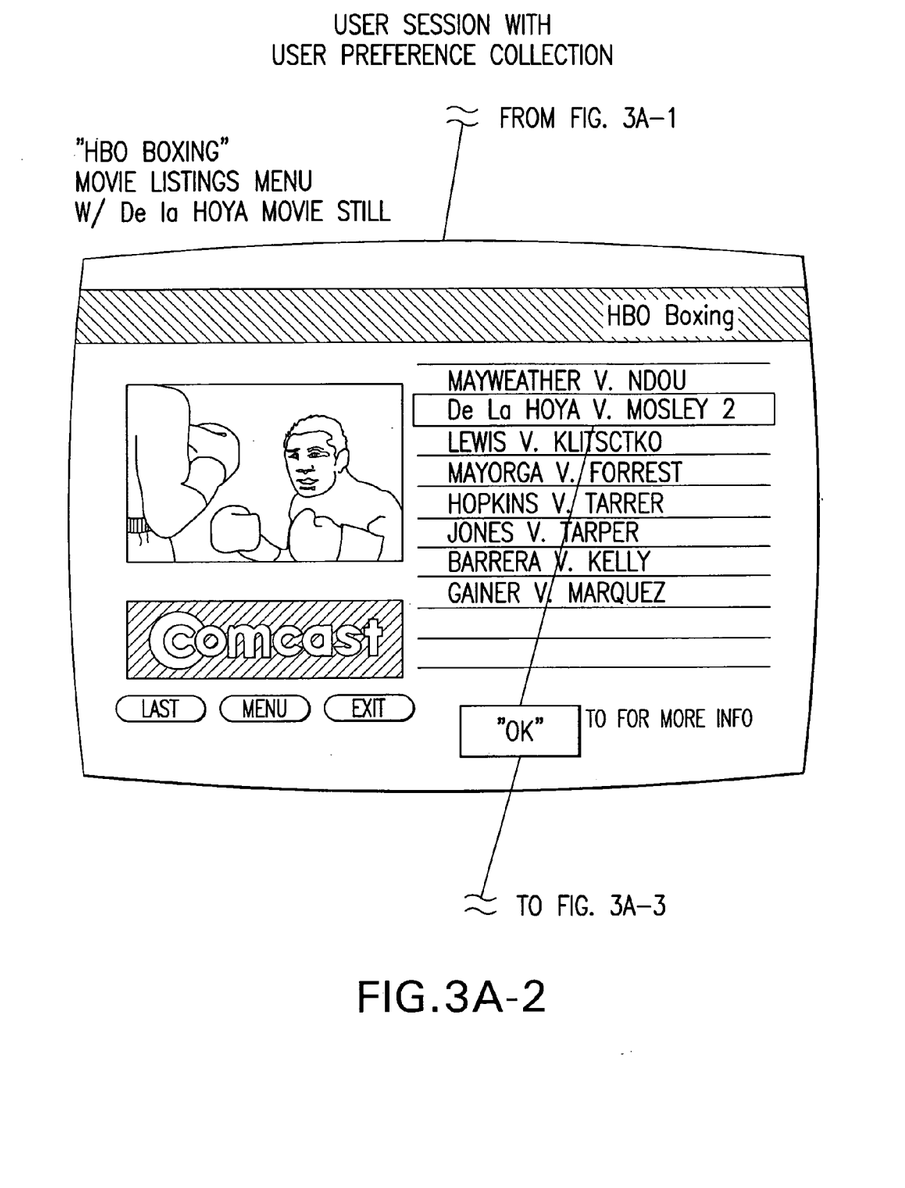
Figure 3A:
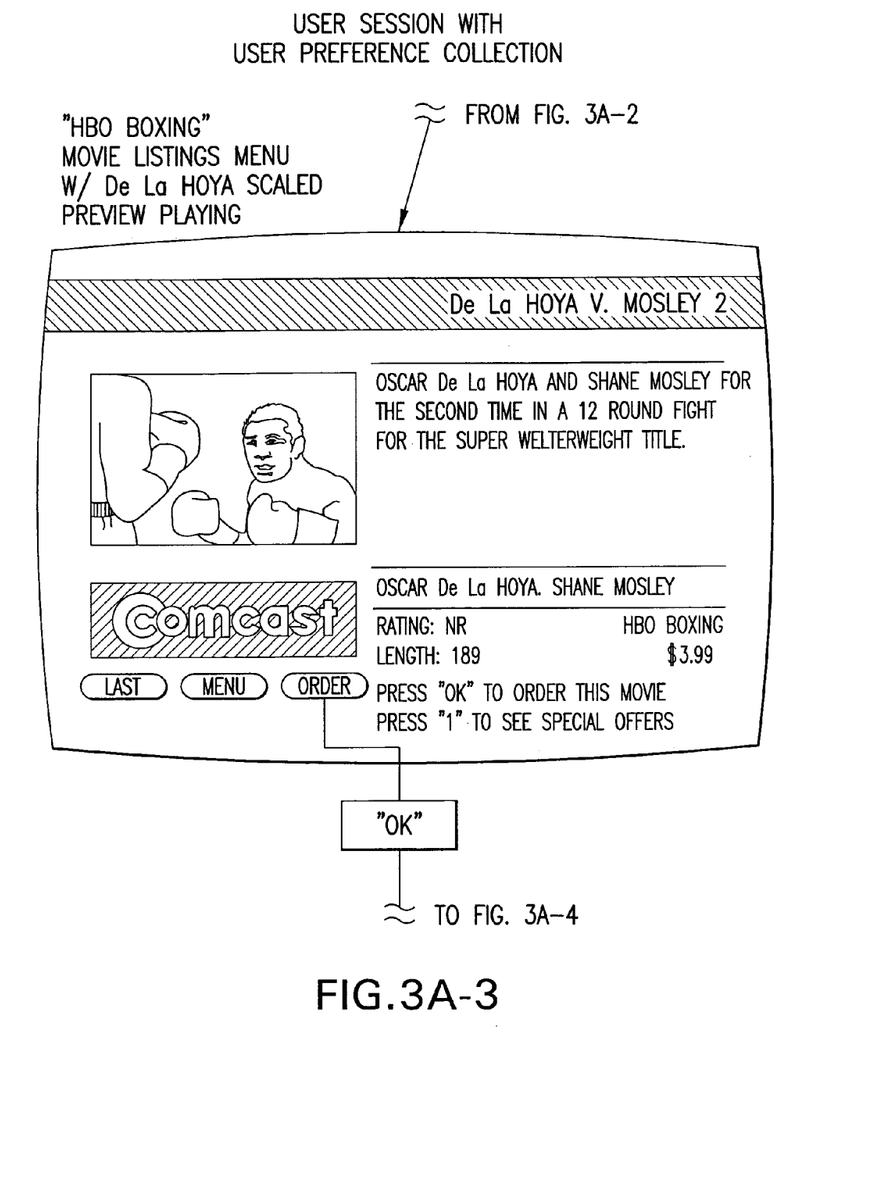
Figure 3A:
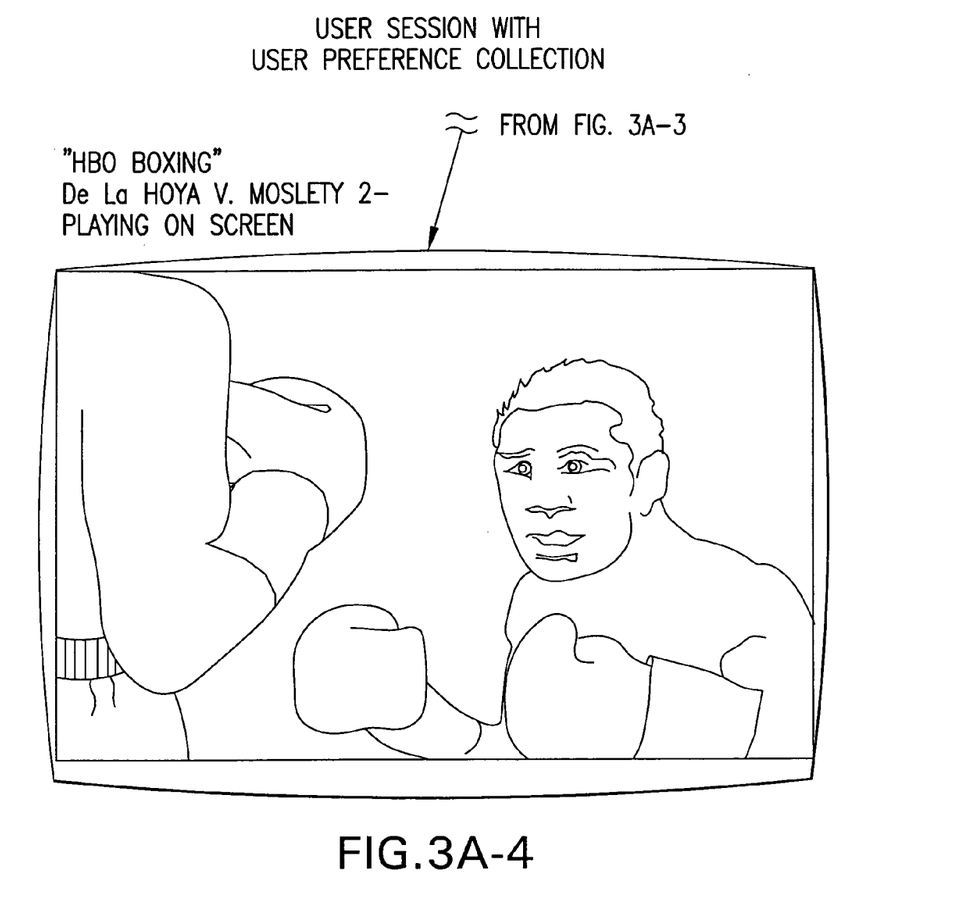
Figure 3B:
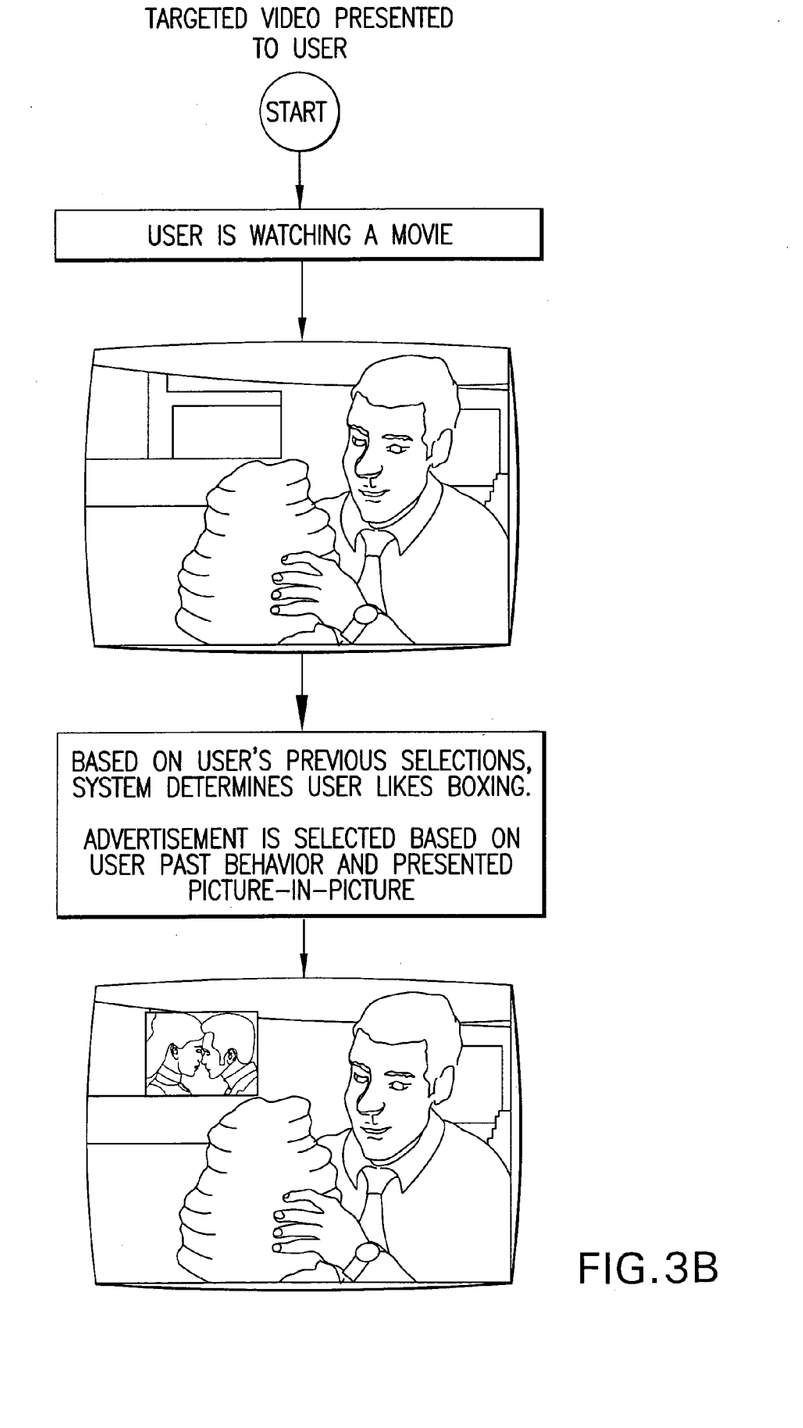

FIGS. 3A and 3B show an example illustrating how user preference data is collected and used to generate a targeted integrated image for delivery to a user. Referring to FIG. 3A, a user starts a session by requesting a menu of sports events. From that menu, the user selects boxing events, and a list of boxing events are shown to user. The user selects a particular boxing event to preview. After previewing the event, the user orders the event, and the boxing event is delivered to the user. Data indicating that the user ordered a boxing event is stored, according to an exemplary embodiment, as part of the user's preference data.

Referring to FIG. 3B, the user later watches a movie. As the user is watching the movie, the user's preference data is obtained, including data indicating that the user previously ordered a boxing event. A barker advertising a boxing event is selected based on the user's preference data, and the barker is integrated with the movie as it is being delivered to the user. Thus, the user is presented with a "picture-in-picture" barker, advertising a boxing event, as the user watches the movie.

It should be understood that the foregoing description and accompanying drawings are by example only. A variety of modifications are envisioned that do not depart from the scope and spirit of the invention.

The above description is intended by way of example only and is not intended to limit the present invention in any way.

What is claimed is:

1. A method for creating at least one targeted integrated image for delivery to a user, the method comprising:
   determining content of potential interest to the user based on at least one user preference comprising content ordering habits of the user while the user is receiving a first image comprising a video file for viewing;
   determining content previously ordered or viewed by the user;
   determining whether the first image is a highest level of a menu comprising multiple levels;
   when the first image is the highest level, selecting from a queue of available barker advertisements, each barker advertisement comprising metadata related to the highest level on the menu, a second image comprising a barker advertising the content of potential interest to the user based upon the metadata relating to the highest level; and
   combining the second image comprising the barker advertising the content of potential interest to the user with the first image to form an integrated image for delivery to the user; and
   delivering the integrated image to the user.

2. The method of claim 1, wherein content ordering habits includes at least one of information indicating times at which the user previously viewed or ordered content, genres of content previously viewed or ordered by the user, characteristics of content previously viewed or ordered by the user, and menu selections made by the user.

3. The method of claim 1, further comprising determining an identity of the user, wherein the content of potential interest to the user is determined based on an at least one user preference associated with the identity of the user.

4. The method of claim 1, further comprising: determining images available in the queue.

5. The method of claim 1, further comprising: marking the second image delivered to the user as having been delivered; and placing the marked image at the end of the queue, wherein the step of selecting selects images sequentially from the beginning of the queue.

6. The method of claim 1, wherein the step of determining is initiated in response to the user accessing the menu or programming guide.

7. The method of claim 1, wherein the step of determining is repeated based on menu or programming guide selections made by the user as the user navigates through the menu or programming guide.

8. The method of claim 1, wherein the step of determining is initiated responsive to the user requesting the video content.

9. The method of claim 1, further comprising repeating the steps for creating at least one new integrated image for delivery to the user.

10. The method of claim 9, wherein the steps are repeated as the user continues to request or receive images.

11. The method of claim 9, wherein the steps are recursively repeated for delivering new integrated images for delivery to the user.

12. The method of claim 1, further comprising compressing at least one of the first image or the second image to forming the integrated image.

13. The method of claim 1, wherein the step of combining includes inserting the second image within the first image, wherein the first image is adapted to appear to the user to be paused.

14. The method of claim 13, wherein the first image is adapted, for delivery to the user, to appear to be paused.

15. The method of claim 13, wherein the first image is adapted, upon delivery to the user, to appear to be paused.

16. The method of claim 1, wherein the barker advertising the content of potential interest to the user has a first genre associated therewith, wherein the video file has a second genres associated therewith, wherein the determining content of potential interest to the user based on at least one user preference comprising content ordering habits of the user comprises selecting the first genre so as to be different from the second genre.

17. The method of claim 1, wherein the integrated image is configured to appear as a picture-in-picture display with the barker advertising the content of potential interest to the user presented as a first picture within a second picture of the video file.

18. An apparatus for creating at least one targeted integrated image for delivery to a user, the apparatus comprising:
a processor for determining content of potential interest to the user based on at least one user preference, prior to or during the user's request for a first image comprising a video file or while the user is receiving the first image;
determining content previously ordered or viewed by the user;
determining whether the first image is a predetermined level of a menu comprising multiple levels;
when the first image is the predetermined level, selecting from a queue of available barker advertisements, each barker advertisement comprising metadat indicatin a enre corresponding to content advertised b the each barker, a second image comprising a barker advertising the content of potential interest to the user from barker advertisements remaining in the queue, the selecting a function of the genre of the metadata and the first image being the predetermined level, and wherein the processor determines the content of potential interest to the user that has not previously been viewed by the user; and
a combiner for combining the second image with the first image to form an integrated image for delivery to the user, and wherein the combiner inserts the second image within the first image.

19. The apparatus of claim 18, wherein the user preference includes information representing content viewing habits or content ordering habits of the user.

20. The apparatus of claim 19, wherein the information representing content viewing or content ordering habits includes at least one of information indicating times at which the user previously viewed or ordered content, genres of content previously viewed or ordered by the user, characteristics of content previously viewed or ordered by the user, and menu selections made by the user.

21. The apparatus of claim 18, wherein the processor determines content of potential interest to the user based on an at least one user preference associated with an identity of the user.

22. The apparatus of claim 18, wherein the first image or the third image is adapted to appear as a picture-in-picture display with the barker advertising the content of potential interest to the user presented as a first picture within a second picture of the video file.

23. The apparatus of claim 18, wherein the processor determines content previously ordered or viewed by the user, determines images available in the queue, and removes removing images related to the previously ordered or viewed content from the queue.

24. The apparatus of claim 18, wherein the processor marks the second image delivered to the user as having been delivered, places the marked image at the end of the queue, and selects images sequentially from the beginning of the queue.

25. The apparatus of claim 18, wherein the processor begins determining content of potential interest to the user responsive to the user requesting the video content.

26. The apparatus of claim 18, wherein the processor begins determining content of potential interest to the user as the user receives the video content.

27. The apparatus of claim 18, wherein the processor repeatedly determines and selects content of potential interest, and the combiner repeatedly combines the selected content with an image for creating at least one new integrated image for delivery to the user.

28. The apparatus of claim 27, wherein the at least one new integrated image is created as the user continues to request or receive images.

29. The apparatus of claim 27, wherein the at least one new integrated image is recursively created for delivery to the user.

30. The method of claim 1, wherein the integrated image is configured to appear as a picture-in-picture display in accordance with predetermined rules.

31. The method of claim 30, wherein the predetermined rules comprise presenting the barker advertising the content of potential interest to the user during an introduction of the video file.

32. The method of claim 30, wherein the predetermined rules comprise presenting the barker advertising the content of potential interest to the user during credits of the video file.

33. The apparatus of claim 18, the predetermined level comprising a highest level of the menu.

* * * * *